May 27, 1941.  H. T. FAUS  2,243,555
MAGNET GEARING
Filed Aug. 21, 1940
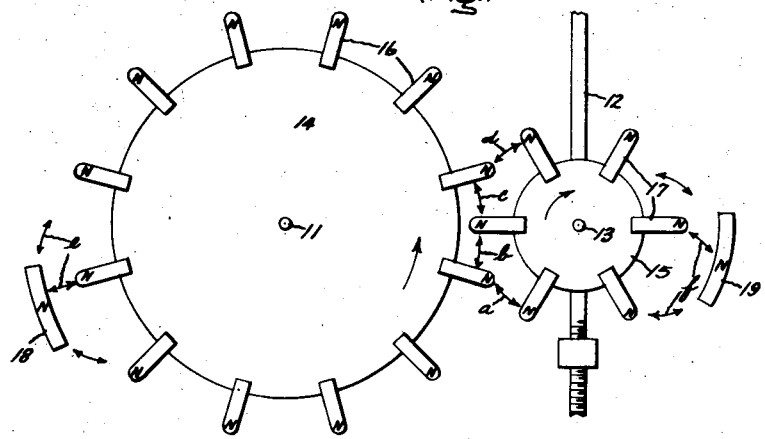
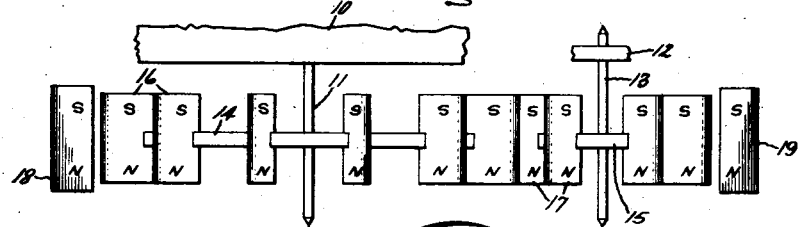
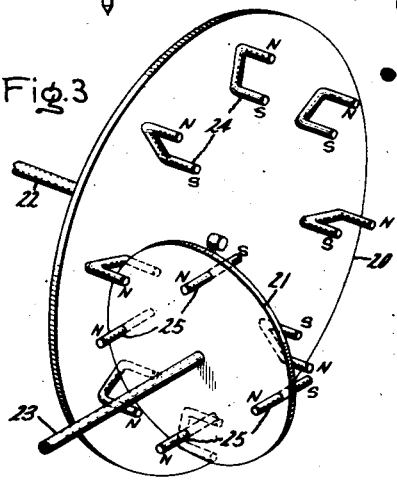
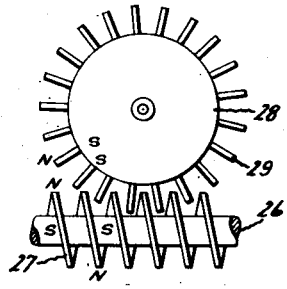
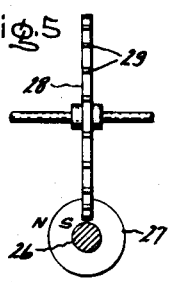
Inventor:
Harold T. Faus,
by Harry E. Dunham
His Attorney.

Patented May 27, 1941

2,243,555

UNITED STATES PATENT OFFICE 2,243,555

MAGNET GEARING

Harold T. Faus, Lynn, Mass., assignor to General Electric Company, a corporation of New York Application August 21, 1940, Serial No. 353,472

6 Claims. (Cl. 172—284)

My invention relates to magnetic gearing whereby rotary motion between shafts may be transmitted without friction or mechanical contact and at any desired speed ratio. In carrying my invention into effect I employ magnetic gears in which the teeth are permanent magnets and the driving forces are transmitted by repulsion of magnetic forces produced by such magnets.

The features of my invention which are believed to be novel and patentable will be pointed out in the claims appended hereto.

For a better understanding of my invention, reference is made in the following description to the accompanying drawing in which Figs. 1 and 2 represent side and plan views of a preferred modification of my invention for transmitting and amplifying rotary motion between a measuring instrument and its pointer. Fig. 3 represents a perspective view of a modified magnetic gear embodying my invention, and Figs. 4 and 5 are views at right angles to each other of a worm gear embodying my invention.

Referring to Figs. 1 and 2, let 10 represent the rotary element of a measuring instrument mounted on a shaft 11, and 12 a pointer on a rotary shaft 13. My magnetic gear is here employed to produce a rotation of pointer shaft 13 at twice the angle of rotation of instrument shaft 11. My magnetic gear here comprises supporting discs 14 and 15 preferably of non-magnetic material having diameters approximately in inverse ratio to the desired transmission ratio. Secured in the peripheries of these discs are a plurality of small permanent magnets 16 and 17 spaced as gear teeth and with the teeth in the two wheels loosely intermeshed so that there need not be any mechanical contact between them but such that if one wheel is rotated while the other is held stationary a direct mechanical gear driving action will occur. The various permanent magnet teeth are all polarized in the same axial direction in both wheels, and like poles of the teeth in one wheel are in line with like poles of the teeth in the other wheel. That is, the north poles of the teeth 16 and 17 are adjacent each other and also are the south poles as they rotate in proximity to each other.

With such an arrangement there is a strong repulsion force between the adjacent magnet teeth in the two wheels which tends to keep the adjacent teeth in the two wheels spaced from each other and prevents direct mechanical contact. This repulsion force occurs at both ends of each tooth because the permanent magnets in the two wheels have their axes lying parallel to each other with like poles adjacent. This repulsion effect may be represented by the double ended arrows $a$, $b$, $c$, $d$ in Fig. 1 between like poles of adjacent magnetic teeth. Now it will be apparent that if wheel 14 be turned slightly in a counterclockwise direction and wheel 15 stands still, the force at $b$ will increase and that at $c$ will decrease. There will be smaller corresponding changes in the forces at $d$ and $a$. If the wheel 15 is free to turn it will be driven in a clockwise direction to equalize the forces tending to turn it. Thus, for the direction of drive suggested, the forces at $b$ and $d$ are driving forces and those at $a$ and $c$ oppose such driving action. Those forces at $c$ and $b$ are the greatest and most effective because acting substantially tangent to the wheels and because the opposite polarity surfaces available for torque purposes are greater and closer together than at $a$ and $d$. It is thus seen that as wheel 14 is turned, wheel 15 will be driven by the magnetic gearing and without mechanical contact unless the wheel 15 is restrained by a force great enough to bring about direct mechanical drive as with ordinary gearing. The constancy of the gear ratio at all points in the intermeshed tooth relationship may be assured by using the proper rounded contour of the gear teeth. In instrument applications such as illustrated the pointer shaft 13 will be well balanced and free to turn so that the instrument deflection is multiplied through a magnetic gear which has no back lash, wear, noise, or friction.

I am aware that it has heretofore been proposed to provide a form of magnetic gearing where magnetic forces of attraction are employed. See for example United States Letters Patent No. 687,292. In such an arrangement the magnetic teeth on different gears cannot touch when in radial alignments and the main flux force is radial instead of being tangential. The teeth may not actually intermesh as in applicant's arrangement. For these reasons my repulsion arrangement where the teeth actually intermesh to provide tangential magnetic driving forces is more efficient than the prior device referred to and in case of driving forces in excess of those which can be transmitted magnetically my arrangement provides a direct mechanical drive. Hence with my gearing the two gears cannot slip and cause the two parts to get out of proper rotative adjustment.

Also because the magnetic forces in my magnetic gear act largely in a tangential direction rather than radially, the side thrust on the gears caused by magnetic attraction between them is absent. In my arrangement there is a relatively small side thrust due to repulsion in the general direction of arrows $a$ and $d$, Fig. 1. This is a repulsion force tending to force the gears away from each other, but it is relatively small as compared to the attraction side thrust present in the arrangement of Patent 687,292. According to another aspect of my invention this side thrust is compensated for by the provision of repulsion permanent magnets 18 and 19 placed adjacent the gear wheels substantially diametrically opposite the point of drive. These compensating forces are represented by arrows $e$ for magnet 18 and $f$ for magnet 19. It will be noticed that I have placed these side thrust compensating magnets slightly below the horizontal line drawn between the two shafts 11 and 13. By so doing I am also able to partially or wholly relieve the bearings for shafts 11 and 13 of the weight of the gear wheels by the upward component of the repulsion forces furnished by magnets 18 and 19. In case the pointer shaft 13 should be directly above shaft 11 the magnet 19 might be omitted and a somewhat stronger magnet used at 18. In case the drive is used to convey a substantial amount of power in a given direction such that there is considerable side thrust on one or both shafts due to such transmission of power, the compensating magnet or magnets would be so placed as to assist in relieving such thrust. The peripheral length of the side thrust compensating magnets should be sufficient to make this compensating force fairly uniform as the gear teeth pass by. These compensating magnets are polarized in the same way as the adjacent gear teeth are polarized and lie parallel thereto as indicated in Fig. 2. The magnitude of such side thrust compensating force can be readily adjusted by moving the compensating magnets toward and away from the magnetic gear wheels, and the direction of such compensating force can be adjusted by moving the compensating magnets around the wheels.

In Fig. 3 I have shown two magnetic gear wheels 20 and 21 with their axes of rotation at right angles to each other at 22 and 23. The gear teeth on wheel 20 are small U-shaped permanent magnets 24 projecting from the side thereof and with their south poles on a circle inside of the north poles arranged on a larger circle. The teeth on the smaller wheel 21 are bar-shaped permanent magnets 25 projecting through supporting disc 21 near its periphery. The wheels or discs 20 and 21 may be of non-magnetic material or soft magnetic material. If the latter, the repulsion forces of the permanent magnet teeth which tend to force the gears away from each other are partially or wholly offset by the attractive force between the permanent magnet teeth on one wheel and the soft iron disc in the other wheel. Also disc 20 may be non-magnetic and disc 21 of soft iron. At the point of mesh the permanent magnet gear teeth have their poles substantially parallel to each other with like poles adjacent to obtain the repulsion driving forces that maintain the gear teeth separated except when the force transmitted is sufficient to cause direct mechanical driving relation. As in Figs. 1 and 2, the main driving force is tangential.

Figs. 4 and 5 represent views at right angles to each other of a worm gear embodying my invention. In this case 26 represents the worm driving shaft having thereon a worm 27 formed of a hardened steel strip spiralled edgewise about the shaft and secured thereto. This worm strip is permanently magnetized with its south pole next to the shaft 26 and its north pole at the periphery. The shaft may be of magnetic material and thus form general south pole piece for the spiral. The driven gear is formed of a supporting disc 28 having radial permanent magnetic teeth 29 secured in its periphery. These teeth are small bar magnets with their north poles outwardly and their south poles inwardly. At the point of mesh the north polarity flux of each set of teeth repel to produce the driving force which tends to maintain the teeth separated but which will allow of a direct mechanical worm drive in case the force transmitted becomes large enough. The repulsion and attractive forces at right angles to the direction of drive may be made approximately equal so as to avoid any appreciable force tending to separate the worm and gear. The drive represented in Fig. 4 may be used between an integrating meter and its register to reduce friction, wear, and noise and to provide a desired amount of resiliency without slipping beneficial to the accurate measurement operation of the meter particularly at light load.

High grade permanent magnetic material should be used for the gear teeth. I have used a heat treated alloy of 60 percent copper, 20 percent nickel, and 20 percent cobalt, and having a residual induction of approximately 2000 with satisfactory results.

In the different forms of my invention illustrated, quite an appreciable spacing has been indicated between the adjacent teeth at the point where they intermesh. This spacing may be varied somewhat, depending upon what results are desired and the amount of load being transmitted. Even where the invention is used under varying loads allowing considerable mechanical contact between the gears, the invention reduces wear and lubrication requirements because a certain amount of the load is transmitted by magnet forces in any event.

What I claim as new and desire to secure by Letters Patent of the United States, is:

1. A magnetic gear arrangement comprising a pair of rotatively mounted supporting structures, permanent magnet teeth on said supporting structures loosely intermeshing with each other, the adjacent surfaces of the teeth on the two supporting structures being of like polarity thereby producing a repelling force tending to maintain the loosely intermeshed teeth separated whereby when one supporting structure is rotated it tends to rotate the other structure without direct mechanical contact between the loosely intermeshed teeth.

2. A magnetic gear drive comprising a pair of loosely intermeshed rotatively mounted gear wheels having teeth magnetized to produce magnetic fluxes of like polarity at the adjacent surfaces of the loosely intermeshed teeth whereby a driving relation is established between said gear wheels by magnetic repulsion forces which tends to maintain the teeth in the two gears separated.

3. A magnetic drive comprising a pair of rotatively mounted members having loosely intermeshed gear teeth, said gear teeth being made of permanent magnet material and being permanently magnetized so as to present like magnet poles adjacent each other in the two members where the teeth are loosely intermeshed and whereby repulsion magnetic forces are produced which tend to maintain the intermeshed teeth in the two members separated, the extent to which said teeth are intermeshed however being sufficient to cause a direct mechanical driving contact of the teeth in case the driving force transmitted therethrough exceeds the repulsion magnetic forces tending to maintain said teeth separated.

4. A magnetic gear drive comprising a pair of rotatively mounted gears having loosely intermeshed teeth, the teeth comprising permanent magnets, a permanent magnet tooth in one member having its poles spaced apart on a line substantially parallel with the spacing of the poles in a permanent magnet tooth on the member at the point where they intermesh and with like poles on intermeshed teeth adjacent each other thereby producing repulsion magnetic forces between the intermeshed teeth which tends to maintain said teeth separated.

5. A magnetic gear drive comprising a pair of rotatively mounted loosely intermeshed gears having permanent magnet teeth so polarized as to produce magnetic repulsion forces between the gears at the point where they intermesh, thereby tending to maintain said intermeshed teeth spaced from each other and stationary permanent magnet means located adjacent the periphery of at least one of said gears polarized to produce a repulsion force with respect to the permanent magnet teeth on such gear and a corresponding thrust on such gear in a direction to offset other thrust thereon.

6. A magnetic gear drive comprising a shaft having a worm thereon, said worm being of magnetic material and magnetized to have its periphery of a given polarity, a gear wheel having teeth thereon loosely meshing with the worm, said gear wheel teeth being of magnetic material and magnetized to present surfaces adjacent to said worm which are of the same magnetic polarity as the periphery of said worm whereby a magnetic repulsion driving relation is established between said worm and gear that permits the transmission of motion therebetween without direct mechanical contact.

HAROLD T. FAUS.